US007865913B2

(12) United States Patent
Hu et al.

(10) Patent No.: US 7,865,913 B2
(45) Date of Patent: Jan. 4, 2011

(54) SYSTEMS AND METHODS FOR COLLABORATION BETWEEN COMPUTERS

(75) Inventors: Xiao Wei Hu, Beijing (CN); Yu Xin Kou, Beijing (CN); Yue Ma, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1262 days.

(21) Appl. No.: 11/289,097

(22) Filed: Nov. 29, 2005

(65) Prior Publication Data

US 2006/0117042 A1    Jun. 1, 2006

(30) Foreign Application Priority Data

Nov. 29, 2004   (CN) .................... 2004 1 0095533

(51) Int. Cl.
G06F 3/00 (2006.01)
G06F 9/44 (2006.01)
G06F 9/46 (2006.01)
G06F 13/00 (2006.01)

(52) U.S. Cl. .................................................. 719/330
(58) Field of Classification Search ................. 719/330; 707/608
See application file for complete search history.

(56) References Cited

U.S. PATENT DOCUMENTS

| 5,220,657 | A  | * | 6/1993 | Bly et al. ..................... 711/152 |
| 5,920,869 | A  | * | 7/1999 | Wakayama et al. .......... 707/812 |
| 6,442,651 | B2 | * | 8/2002 | Crow et al. .................. 711/118 |
| 6,507,845 | B1 |   | 1/2003 | Cohen et al. |
| 7,003,550 | B1 | * | 2/2006 | Cleasby et al. .............. 709/205 |
| 7,360,164 | B2 | * | 4/2008 | Bjoernsen et al. ........... 715/751 |
| 7,757,168 | B1 | * | 7/2010 | Shanahan et al. ........... 715/255 |
| 7,757,210 | B1 | * | 7/2010 | Krueger ....................... 717/120 |
| 2002/0129175 | A1 |   | 9/2002 | Banavar et al. |
| 2003/0167284 | A1 |   | 9/2003 | Friedli et al. |

(Continued)

FOREIGN PATENT DOCUMENTS

WO    WO0239351    5/2002

OTHER PUBLICATIONS

INSPEC An inference engine for web adaptive, INSPEC Modeling collaboration A platform for remote collabortive experiment, SCM Digital Library: An abstraction for awareness managment in collaboration virtual environments—Antunes, M. et al.; 2001, Modeling Collaboration using Shared Objects—Schuckmann, C, et al,: 1999.

Primary Examiner—H. S. Sough
Assistant Examiner—KimbleAnn Verdi
(74) Attorney, Agent, or Firm—The Brevetto Law Group

(57) ABSTRACT

A collaboration system and method via computer is provided. The collaboration system comprises a computing platform for storing an identifier, address and other information associated with at least one object; at least one service connector for communicating with a service using the identifier, address of the at least one object to interact with the service for the information associated with the object and transfer the information to the computing platform; and at least one tool for communicating with the computing platform to exchange the information associated with the object. According to the present invention, a tool may display the current information of a remote object. The tool does not necessarily have the capability to communicate with different remote services. Therefore, user might concentrate on the collaboration object and tools.

17 Claims, 1 Drawing Sheet

U.S. PATENT DOCUMENTS

2003/0182375 A1* 9/2003 Zhu et al. .................. 709/205
2003/0221023 A1* 11/2003 Peddada et al. ............. 709/330
2005/0086264 A1* 4/2005 Masuda .................. 707/104.1
2005/0097450 A1* 5/2005 Lumera et al. ............. 715/511

* cited by examiner

SYSTEMS AND METHODS FOR COLLABORATION BETWEEN COMPUTERS

TECHNICAL FIELD

The present invention relates to information exchange between tools in different computers and in one same computer, more particularly, relates to collaboration system and method via computers.

BACKGROUND

When handling events or documents with computers, collaboration between computers is frequently concerned to process an object or document together. Usually, there is a need to invoke or call for remote service. When collaboration relates to an object, prior art will treat an object as plain text, or invoke the object and all of its content to process. Treating an object as plain text to process will lost the status and content of the object. Furthermore, corresponding remote service might be closed or canceled. This will make the process useless. Invoking the object and all of its information including content will cause the process system very slow when there are huge amount of information data. However, the information required might only be part of object information, e.g. part of the object content.

For example, many documents related with collaboration comprise people names. These people names will be treated as normal text to be processed by existing edit tools. In some integrated environment, some tools or applications, e.g. email, chat tools or calendar tools can support on-line collaboration. Some tools or applications do not support on-line collaboration. Many times, there is no need for user to be on-line all the time. Therefore, there is a need that all office software (tools or applications) could directly invoke name object in documents. This will facilitate the collaboration.

Similar to people names, there are many other type of objects in the existing system environment, e.g. address, date, company names and events, etc. Many documents or applications will refer to these objects. Being aware of the status or content of these objects by the documents or applications, will greatly facilitate the collaboration between them.

Furthermore, although many existing applications could handle objects, their processing capability is usually limited to one or several particular types of object. For example, Instant Messaging (IM) could process people names as objects, obtain the status of these people in real time, and allow conversation among several people. Calendar tool could schedule the information of a person and arrange a meeting.

The collaboration between different tools will require the status of concerned objects. For example, email tools will need the status information of the receiving email box. Ignoring such information might cause mail delivery failure. Moreover, not knowing the link status of an URL might cause operation failure related with the URL.

In prior art, if an application requires the information in a remote service, special programming might be required. For example, conversation with Instant Messaging will require communication with IM service to know whether the counter part is on-line.

If an object is cited in a tool, and the tool could not communicate with corresponding remote service for the object, then the tool could only treat the object as a text string. If other tools need to collaborate with the object, user must input related information.

In order to solve the problem in collaboration on same objects, Microsoft Corporation provides a technique with Smart Tag and Smart Document. Wherein, object links are identified with word match. The links could only be used to invoke corresponding tools defined by programming for processing. However, special programming for every tool is required to identify links in a particular context and invoke other tools to handle the links properly. When the number of tools for collaboration increases, the programming work becomes heavy and cause low efficiency.

The patent application US20030225789 suggests applications transform objects between each other, and uses metadata stored in repository for conversion. The application has to 'know' each other to transfer the objects to a particular application. If the object is a link to a remote object, the metadata of the object has to be got from remote service by the application. Like other current solutions, the object/link is most likely to be treated as text string unless the application is programmed for remote service access.

SUMMARY OF THE INVENTION

In order to overcome the shortcoming of the prior arts, one object of the present invention is to provide a system and method to facilitate the collaboration between a plurality of tools.

A further object of the present invention is to provide system and method to facilitate the collaboration for objects between a plurality of tools in a computer and between different computers.

According to one aspect of the present invention, a collaboration system is provided. The collaboration system comprises: a computing platform, for storing an identifier, address of at least one object and other information associated with the object; at least one service connector, for communicating with a service using the identifier and address of the at least one object, to interact with the service for information associated with the object and transfer the information to the computing platform; and at least one tool, for communicating with the computing platform to exchange the information associated with the object.

According to a further aspect of the present invention, a collaboration method is provided. The collaboration method comprises: a tool identifying the identifier and address of an object, and transfer the information to a computing platform; the computing platform checking whether the object being already in its storage and, if yes, obtaining the information associated with the object from its storage; if the object is not in the storage of the computing platform, the computing platform communicating with a corresponding service using the identifier and address of the object via a service connector to obtain the information associated with the object; and the computing platform transferring the obtained information associated with the object to the tool.

According to a further aspect of the present invention, the information associated with an object comprising the metadata, status and/or at least part of the object content.

With the collaboration of the present invention, same or different tools in a plurality of computers could conveniently collaborate for the objects in remote services. The collaboration system comprises a computing platform, service connector and tools for collaboration. Wherein tools could handle objects and display or process the metadata, status and content of objects. The computing platform receives the identifier and address of an object from a tool. A service connector communicates remote or local service with the identifier and the address of the object to obtain the information of the object, and return the information to the computing platform. The service connector also communicates with remote service to update the information of the object in real time. The computing platform stores the object information and provides them to the tool for collaboration. Therefore, tools could specialize on its function, and the required information will be maintained by the computing platform and the service connector. Every tool could register the object type it could handle with the computing platform. A tool could obtain such information of other tools via the computing platform. Thus, a tool could invoke or initiate other tools for processing an object. User does not need to know all the tools for processing an object beforehand, but could invoke tools for an object as required.

According to the present invention, a tool could display the current information of a remote object, but do not required to be able to communicate with different remote services. For example, a text editor could display the online/offline information in the text, but need not to be connected to remote services, such as MSN, ICQ and AOL, etc. Therefore, tool developer could be concentrate on the processing capability for a particular object. The communication with different service will be handled by service connector.

According to the present invention, the user could concentrate on the collaboration object (item, people, document and event, etc.). The system could list the available tools for a particular object. The user even does not need to know what tools have been installed on his computer and how to invoke these tools. This will facilitate user management in a company.

For the object in local computer and the object in the remote service, the present invention provides uniformed object management for collaboration tools. When a new type of object needs to be added, processing tools could register the object on the computing platform via a predefined standard interface. Then, user could invoke proper tools via the computing platform to process and collaborate with others via remote service.

DETAILED DESCRIPTION OF EMBODIMENTS

Figure 1:
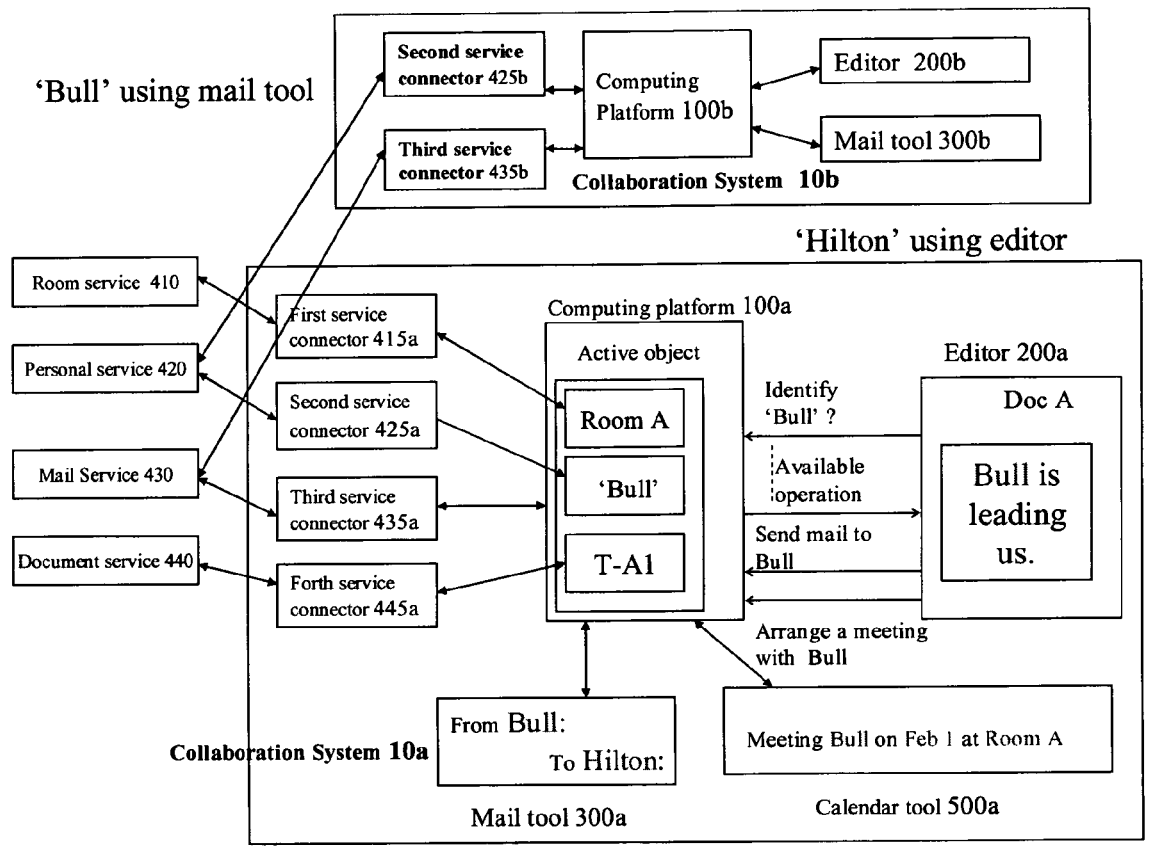
FIG. 1 illustrates the collaboration system according to one embodiment of the present invention.

FIG. 1 illustrates the collaboration system according to one embodiment of the present invention. Wherein, the collaboration system comprises a computing platform, a plurality of tools and a plurality of service connectors. The collaboration system could be implemented on, but not limited to, a personal computer. In FIG. 1, there are two collaboration systems. Wherein, a people named Bull is working on a collaboration system 10*b* with an email tool 300*b*, another people named Hilton is working on a collaboration system 10*a* with an editor 200*a*.

The Bull's collaboration system comprises a computing platform 10*b*, an editor 200*b*, an email tool 300*b*, a second service connector 425*b* for communication with personal service, and a third service connector 435*b* for communication with mail service. The computing platform 100*b* is for storing the identifier, address, metadata, status, part of the content or the content and other information associated with at least one object. The service connectors 425*b* and 435*b* are for communicating with local or remote services using the identifier, address of the at least one object, to obtain the metadata, status, part of the content or the content and other information associated with the object and transfer the information to the computing platform. The service connector could also transfer the information related with the object stored in the computing platform to the remote or local services. Editor 200*b* and email tool 300*b* could communicate with the computing platform to exchange the information of the object.

Hilton's collaboration system 10*a* is similar to Bull's collaboration system 10*b*. The collaboration system 10*a* comprises a computing platform 100*a*, a plurality of tools and service connectors corresponding to a plurality of objects and services 415*a*, 425*a*, 435*a* and 445*a*. The tools comprise editor 200*a*, email tool 300*a* and calendar tool 500*a*. The computing platform 100*a* stores the identifier, address of at least one object (such as object room A, people name object Bull and subject object T-A1 in the document Doc A illustrated in the FIGURE). The computing platform 100*a* also stores the metadata, status, at least part of the content or the content associated with the object. The service connectors 415*a*, 425*a*, 435*a* and 445*a* will communicate with local or remote services using the identifier, address of the at least one object, to obtain the metadata, status, part of the content or the content and other information associated with the object and transfer the information to the computing platform. For example, the first service connector 415*a* will communicate with the remote room service 410 to obtain the metadata, status or content associated with Room A. The above mentioned remote services comprise the Room Service 410, Personal Service 420, Email Service 430 and Document Service 440 as illustrated in the FIGURE. All of the services or part of the services could be local services. In the collaboration system 10*a*, there are service connectors 415*a*, 425*a*, 435*a* and 445*a* for communicating with these remote services to exchange information. Editor 200*a*, email tool 300*a* will communicate with the computing platform to exchange information related with the object. Hilton will obtain the object information, such as the metadata of the object, and decide further action.

Hilton opens a document Doc A with editor 200*a*. The document could comprise a plurality of subjects/titles and corresponding contents. Some content corresponding to some subjects could be stored at document service 440. These subjects, such as T-A1 in document Doc A, could be stored as objects, such as object T-A1, in the document Doc A. In document Doc A, the object T-A1 comprises the address of the Document Service 440 and object identifier associated with the object. The document Doc A also comprises people name object Bull and object Room A. The object Bull in document Doc A comprises the address of the Personal Service 420, the object identifier in the service and the email address associated with the object. The object Room A comprises the address of the Room Service 410 and the object identifier in the service associated with the object.

Editor 200*a* identifies the above object in the document Doc A according to predefined object standard. Editor 200*a* registers these objects with the computing platform via predefined interface or other ways, e.g. shared name space. Then, the computing platform 100*a* transfers the identifier and address of the objects to service connectors. The service connectors communicate with remote services to obtain the information of the objects and return the information to the computing platform. For example, the editor 200*a* registers the identifier and address of objects Room A, Bull and T-A1 with the computing platform 100*a*. Then, the first service connector 415*a* communicates with Room Service 410 according to the identifier and address of the object Room A, to obtain the metadata, status or contents of Room A, and return the information to the computing platform 100a. A user can specify part or all of the information associated with the object as required. Thus, the service connector could only interact with the services for the part or all of the information. The computing platform 100a stores this information and provides the information to tools like editor 200a as requested.

The computing platform 100a could store these objects in an area for storing active objects, and maintain an active object list and may maintain an inactive object list at the same time. When receiving an object to be registered, the computing platform 100a will check whether the object is already in its list. If there is no such object in the list, then add the object to the active object list and transfer the identifier and address of the object to the corresponding service connector. Then, the service connector will communicate with local or remote service to obtain the metadata, status or content of the object, and return the information to the computing platform. The computing platform stores the information for editor 200a and other tools to invoke as required.

For the inactive object, the collaboration system could predefine a expiration time for storage of its information. The collaboration system will cancel the information of the inactive object and/or the inactive object after the expiration time. If the object to be registered has been searched out in the inactive object list, then the system will set the object as an active object and add it to the active object list. Then, the information associated with the object, such as the metadata, status or content of the object, will be updated by a service connector. If the service connector could not communicate with the remote service, e.g. due to network fault or temporary closing of remote service, then the stored information of the object will be provided to the above editor 200a and other tools with a note indicating that the information is yet to be updated. Under such circumstance, the service connector will periodically try to communicate with the remote service to update the information. Under some circumstances, the un-updated information is still helpful for the user. For example, the information for the object Room A comprises the number of people the room could accommodate. For the information from remote services, the user could configure to temporarily store it before shut down the computer, or store it for a predefined time. Such configuration will facilitate the collaboration for users.

Before a service connector communicates with a remote service for obtaining the information of the object, especially for updating the information of the object, user could predefine that only part of the information of the object (e.g. the status) will be obtained or updated. For example, for the object Room A in the embodiment of FIG. 1, Hilton might only want to know the status of Room A, whether Room A or the Room Service is available, etc. For the other information of Room A, e.g. position, size or layout specification, Hilton might already know or not be interested. Then, the first service connector 415a only needs to communicate with Room Service 410 for the required information, e.g. whether Room Service is available.

For the object subject/title T-A1, the forth service connector 445a only needs to communicate with Document Service 440 to obtain the information on whether the document service or the document related to the object subject T-A1 is available. But, the document related to the object subject T-A1 will be obtained by the forth service connector when the editor 200a requests to invoke it. As an alternative, the forth service connector 445a might obtain all the related information from the Document Service 440 when receiving the identifier and address of the object subject T-A1. Then, the service connector returns the obtained information to the computing platform. The editor 200a could directly invoke the information as required.

The information related with Bull could be handled in a way similar to the above method.

After reading the document Doc A, Hilton wants to hold a meeting with Bull at Room A on February 1. According to the present invention, Hilton could directly obtain the information related with Bull and Room A via the collaboration system. For example, when a user select the object Bull with a mouse, the metadata, status or content of the object Bull including the effective email address of Bull will be displayed in the window of the editor 200a.

When the editor 200a, email tool 300a and calendar tool 500a are installed on Hilton's computer, these tools might register with the computing platform the type of object they could identify and process. For example, email tool 300a and calendar tool 500a register with the computing platform that they could identify and process people name object. When a people name object is selected in the editor 200a, tools, including email tool, which could be invoked via the computing platform will be displayed in the window of the editor 200a. Thus, Hilton might invoke email tool 300a or calendar tool 500a when reading the document Doc A, and arrange a meeting with Bull. Because the computing platform 100a stores the updated information of Bull and Room A, etc, the communication can be handled effectively and in real time. The email sent to Bull will not be returned with failure, and Room A is unlikely to be unavailable.

According to a further aspect of the present invention, the collaboration system 10 might further comprise object information selection means (not shown in the FIGURE) for selecting the object related information required by the collaboration system. The service connectors and services will only exchange the selected information. The object information selection means could be implemented in the collaboration system or in the tools. User could select an object in a tool and select the required information related with the object.

In the present invention, the service connectors exchanging with the services the information of the object means that the service connectors might obtain the information of the object from the services, or transfer (it is not a must) the information of the local objects to the services.

The services in the present invention comprise (but not limited to) object services, service systems or service means implemented in computing means or servers, etc.

According to a further aspect of the present invention, standard Application Programming Interface (API) might be predefined between the computing platform, tools and service connectors for collaboration. A standard API will be illustrated below for reference only. A person skilled in the art could understand that it is only a preferred embodiment. A person skilled in the art might define other type of interface according to the existing interface technique or use other method (e.g. shared name space technique) for interaction between the computing platform, tools and service connectors.

The standard API might comprise standard definition of function calls and interface data that transfer or exchange between the components. The computing platform and tools might use the following APIs to work on the project.

RegisterObject(Object) return the Object Id: It is used by a tool to register an Object to the platform. The returned ID is used by the tool for following operations.

GetAvailableActions( ) return a list of Action and Object Type pairs: It is used by a tool to get available action provided by tools for particular kinds of object. For example, clicking an object with the auxiliary button (e.g. the right button) of a mouse, a pull down menu with possible operations to the object will be displayed.

InvokeAction(Action Id, Object Id) is used by a tool to ask platform to invoke another tool for required action on particular object.

GetMetaData(ObjectId) is used by a tool to get meta data for a particular object.

Object standard might be defined for collaboration between the computing platform, tools and service connectors. Following is a sample definition of object.

```
Class ActiveObject {
    String ObjectId;
    String serviceaddress;
    String Name;
    String Type;
    Integer Size;
    Object MetaData;
    Object Content;
}
```

When a tool works on the platform for the first time, it registers its self to the platform and the types of object it can handle using the RegisterObject( ).

According to a further aspect of the present invention, a plurality of tools/applications or plurality types of tools/applications might dynamically identify objects and collaborate with each other. The computing platform according to the present invention might be used for managing active object; tools work on some particular types of objects and process the content of the objects; and service connectors might be used for obtaining metadata and content of some particular types of objects. Then, the objects might be invoked in the processing environment of other tools, e.g. in the document of an editor. These tools might inform the computing platform the objects needed to be handled by them, and obtain the metadata and content of the objects from the computing platform, or transfer the metadata and content of the objects back to the computing platform after processing. A tool might select an object from the content being processed, and invoke another tool via the computing platform to process the object.

According to a further aspect of the present invention, the collaboration between the local tools on objects might be implemented by directly interacting between the tools and the computing platform, or interacting between the tools and the computing platform via service connectors.

According to a further aspect of the present invention, for the collaboration between different computers with metadata or contents of objects obtained or updated from remote services, service connectors will communicate with remote service according to the identifier and address of the objects. Tools capable of identifying and/or processing objects might register its capability with the computing platform via installation or provision. Tools communicate with the computing platform to inform the objects being processed or inform the object in the content being processed. The computing platform set these objects as active objects and obtains the object information from object services, and returns the information to the tools. Tools might display the information of the object, including status, with proper format. For example display with one color for the identifier, status or information of the object being obtained for the first time, and with another color for the status or information of the object being updated.

In the active objects, an object may associate with other objects or comprises other objects. Tools will identify objects embedded in an object when they open the object, register with the computing platform the embedded objects and obtain the related status and other information of the objects from the computing platform. For example, an editor opens a document embedded with people name objects. The editor will identify these people name objects according to the standard for embedded object. Then, the editor sends the information of the object/link to the computing platform, and creates an active object in the computing platform. Corresponding service connectors will obtain the metadata and other information of the object from corresponding services. If the objects already exist in the computing platform, then the editor will obtain the information of the object directly from the computing platform.

The computing platform might inform a tool the status/metadata of an object and the tools (e.g. email tool, chat tool or calendar tool) that could be invoked for processing the object. Thus, user will know the status of the object and the operations for the object in the tool. For example, user might send an email, start a chat or schedule a meeting appointment, etc.

When the document is closed, the tool will inform the computing platform to cancel the objects only for the document from the active objects stored in it. As an alternative, the computing platform might set such objects as inactive objects, and keep their information for a predefined time in case the tool or other tools will invoke the object again.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

The invention claimed is:

1. A collaboration system implemented in a computer, comprising:
   a computing platform, for storing information associated with an object including an identifier and an address of the object and other information associated with the object, wherein the other information associated with the object comprises metadata, status or at least part of the content;
   a storage area of said computing platform, wherein content containing the object is a document stored in the storage area of the computing platform;
   at least one service connector, for communicating with a service using the identifier and address of the object, to interact with the service for the metadata, the status or the at least part of the content associated with the object and transfer the metadata, the status or the at least part of the content associated with the object to the computing platform;
   a display associated with the computing platform configured to display said information associated with the object, said display further being configured to display a status of said information associated with the object; and
   at least one tool, for communicating with the computing platform to exchange the information associated with the object, the at least one tool configured to identify and extract the object from text or process being handled by the at least one tool, and register the identifier and address of the object to the computing platform, wherein the at least one tool is selected from the group consisting of text editor, email tool, and calendar tool;

wherein the computing platform is configured to set the object registered with the computing platform as an active object, and the at least one service connector updates the metadata, the status or the at least part of the content of the active object in response to the object registered with the computing platform being set as the active object.

2. The collaboration system of claim 1, wherein the service comprises remote or local service.

3. The collaboration system of claim 1, wherein the at least one tool registers object kinds it could identify or process to the computing platform, the at least one tool being configured to process the object by invoking another tool via the computing platform.

4. The collaboration system of claim 1 further comprising a plurality of service connectors corresponding to a plurality of object types.

5. The collaboration system of claim 1, wherein the at least one service connector communicates with the service according to predefined configuration to update the metadata, the status or the at least part of the content associated with the object; and displays the updated metadata, status or at least part of the content associated with the object with specific format after the metadata, the status or the at least part of the content associated with the object is updated.

6. The collaboration system of claim 1, wherein the computing platform, the at least one service connector, and the at least one tool communicate with each other via predefined standard interfaces.

7. The collaboration system of claim 1 further comprises an object specifying means, for specifying the information associated with the object required by the collaboration system; and the at least one service connector only interacts with the service for the specified information.

8. The collaboration system of claim 1, wherein the at least one tool adds a new type of object to the computing platform via a predefined standard interface.

9. A collaboration method, comprising:
storing content containing an object on a computing platform, wherein said content is a document;
a tool identifying information associated with the object including an identifier and address of the object, and transferring the information associated with the object to the computing platform, identifying and extracting the object from the text or process being handled by the tool, and registering the identifier and address of the object to the computing platform, wherein the tool is selected from the group consisting of text editor, email tool and calendar tool, wherein the computing platform sets the object registered with the computing platform as an active object;
the computing platform checking whether other information associated with the object is already in its storage and, if yes, obtaining the other information associated with the object from its storage, the other information associated with the object comprises metadata, status or at least part of the content;
if the metadata, the status or the at least part of the content associated with the object is not in the storage of the computing platform, the computing platform communicating with a corresponding service using the identifier and address of the object via a service connector to obtain the information metadata, the status or the at least part of the content associated with the object, wherein the service connector updates the metadata, the status or the at least part of the content of the active object in response to the object registered with the computing platform being set as the active object;
the computing platform transferring the obtained metadata, the status or the at least part of the content associated with the object to the tool; and
displaying said information associated with the object and a status of said information associated with the object.

10. The collaboration method of claim 9, wherein the collaboration method is implemented in a personal computer, and the service comprises remote or local service.

11. The collaboration method of claim 9, wherein the tool registers an object type it could identify or process to the computing platform; said tool being configured to process an object by invoking another tool via the computing platform.

12. The collaboration method of claim 9, wherein the computing platform obtains information associated with a plurality of objects including the other information associated with the object via a plurality of service connectors corresponding to a plural kinds of objects.

13. The collaboration method of claim 8, wherein the service connector periodically communicates with the service to update the metadata, the status or the at least part of the content associated with the object; and displays the updated metadata, the status or the at least part of the content associated with the object with specific format in the tool after the metadata the status or the at least part of the content associated with the object is updated.

14. The collaboration method of claim 9, wherein the computing platform, the service connector and the tool communicate with each other via predefined standard interfaces.

15. The collaboration method of claim 9 further comprises specifying the information associated with the object required for collaboration, and the service connector only interacts with the service for the specified information.

16. The collaboration method of claim 9, wherein the tool adds a new type of object to the computing platform via a predefined standard interface.

17. The collaboration method of claim 9 further comprising of transferring the information associated with the object stored in the computing platform to the service via the service connector.

* * * * *